(12) United States Patent
Xu

(10) Patent No.: US 11,153,444 B2
(45) Date of Patent: Oct. 19, 2021

(54) METHOD AND DEVICE FOR POLICY DETERMINATION, AND STORAGE MEDIUM

(71) Applicant: GUANGDONG OPPO MOBILE TELECOMMUNICATIONS CORP., LTD., Guangdong (CN)

(72) Inventor: Yang Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/037,551

(22) Filed: Sep. 29, 2020

(65) Prior Publication Data

US 2021/0029253 A1 Jan. 28, 2021

Related U.S. Application Data

(63) Continuation of application No. PCT/CN2019/079141, filed on Mar. 21, 2019.

(51) Int. Cl.
*H04M 15/00* (2006.01)
*H04W 4/40* (2018.01)
(Continued)

(52) U.S. Cl.
CPC ............ *H04M 15/66* (2013.01); *H04W 4/40* (2018.02); *H04W 8/08* (2013.01); *H04W 48/16* (2013.01); *H04W 92/18* (2013.01)

(58) Field of Classification Search
CPC ........ H04M 15/66; H04M 1/00; H04M 15/61; H04M 15/62; H04W 4/40; H04W 8/80;
(Continued)

(56) References Cited

U.S. PATENT DOCUMENTS 6,286,052 B1* 9/2001 McCloghrie ........ H04L 41/0893
370/235
9,967,348 B2* 5/2018 Montemurro ........... H04L 63/20
(Continued)

FOREIGN PATENT DOCUMENTS

CN 1394091 A 1/2003
CN 1529478 A 9/2004
(Continued)

OTHER PUBLICATIONS

Oppo et al. "Clarification on Using PSI" SA WG2 Meeting#127, S2-183203, Apr. 10, 2018 (Apr. 10, 2018), section 6.1.2.2.
(Continued)

*Primary Examiner* — Thomas R Cairns
(74) *Attorney, Agent, or Firm* — Perkins Coie LLP

(57) ABSTRACT

A method and device for policy determination and a storage medium are provided. The method includes that: User Equipment (UE) receives first information transmitted by a network device, here, the first information includes a first policy and the first policy includes a policy type corresponding to the first policy; the network device is a Policy Control Function (PCF), a content of the first information is divided into at least one section and is encapsulated into a container by the PCF for transmitting to a Core Access and Mobility Management Function (AMF), and the container is transparently transmitted to the UE by the AMF; the policy type corresponding to the first policy comprises at least one of a PC5 interface-based Vehicle to Everything (V2X) policy, or a Uu interface-based V2X policy.

10 Claims, 9 Drawing Sheets

(51) Int. Cl.
*H04W 8/08* (2009.01)
*H04W 48/16* (2009.01)
*H04W 92/18* (2009.01)

(58) Field of Classification Search
CPC ....... H04W 48/19; H04W 92/18; H04W 8/08;
H04W 4/24; H04W 4/42–48; H04W
8/082–16; H04W 8/26; H04W 12/02;
H04W 28/04; H04W 28/10; H04W
36/0022; H04W 36/0033; H04W 36/14;
H04W 48/02; H04W 76/10; H04W
76/11–19; H04W 84/18; H04W 88/02;
H04W 88/021–028; G06F 1/1626; H04B
1/38; H04B 1/7075; H04L 12/1407;
H04L 29/06088; H04L 29/06551; H04L
29/12009; H04L 41/0893; H04L 47/20;
H04L 47/70; H04L 47/74
See application file for complete search history.

(56) References Cited

U.S. PATENT DOCUMENTS

| | | | | |
|---|---|---|---|---|
| 10,231,250 | B2* | 3/2019 | Griot | H04W 8/20 |
| 10,609,667 | B1* | 3/2020 | Cakulev | H04B 7/0417 |
| 10,701,587 | B2* | 6/2020 | Chaponniere | H04L 5/0044 |
| 2004/0243600 | A1* | 12/2004 | Ikeda | G06F 3/0605 |
| 2019/0246282 | A1* | 8/2019 | Li | H04L 63/205 |
| 2019/0289459 | A1* | 9/2019 | Shan | H04M 15/00 |
| 2020/0112850 | A1* | 4/2020 | Lee | H04W 4/40 |
| 2021/0037380 | A1* | 2/2021 | Lee | H04W 12/08 |

FOREIGN PATENT DOCUMENTS

| | | | |
|---|---|---|---|
| CN | 109315004 A | 2/2019 | |
| WO | WO-2020160178 A1 * | 8/2020 | H04W 4/46 |

OTHER PUBLICATIONS

Intel et al. "UE Triggered UE Policy Provisioning Procedure" 3GPP TSG-SA WG2 Meeting#131, S2-1901884, Feb. 19, 2019 (Feb. 19, 2019), section 4.2.4.X.

3rd Generation Partnership Project;Technical Specification Group Services and System Aspects;Architecture enhancements for V2X services(Release 15);3GPP TS 23.285 V15.2.0 (Dec. 2018).

International Search Report in the international application No. PCT/CN2019/079141, dated Nov. 11, 2019.

3rd Generation Partnership Project; Technical Specification Group Services and System Aspects; Procedures for the 5G System; Stage 2 (Release 15), 3GPP TS 23.502 V15.2.0 (Jun. 2018).

Supplementary European Search Report in the European application No. 19919915.9, dated Aug. 20, 2021. 8 pages.

* cited by examiner

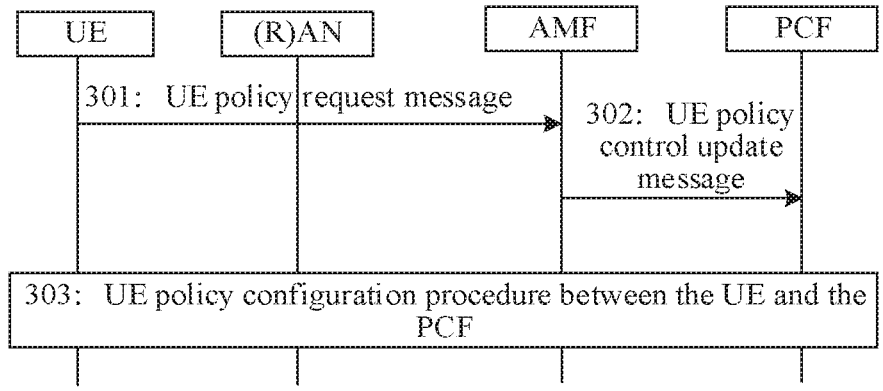

FIG. 3

A UE receives first information transmitted by a network device, here, the first information includes at least one of: a first policy, a policy type corresponding to the first policy, a service type corresponding to the first policy, indication information indicative of whether the UE is allowed to request the first policy, or a trigger condition for the UE to request the first policy ⟶ 401

FIG. 4

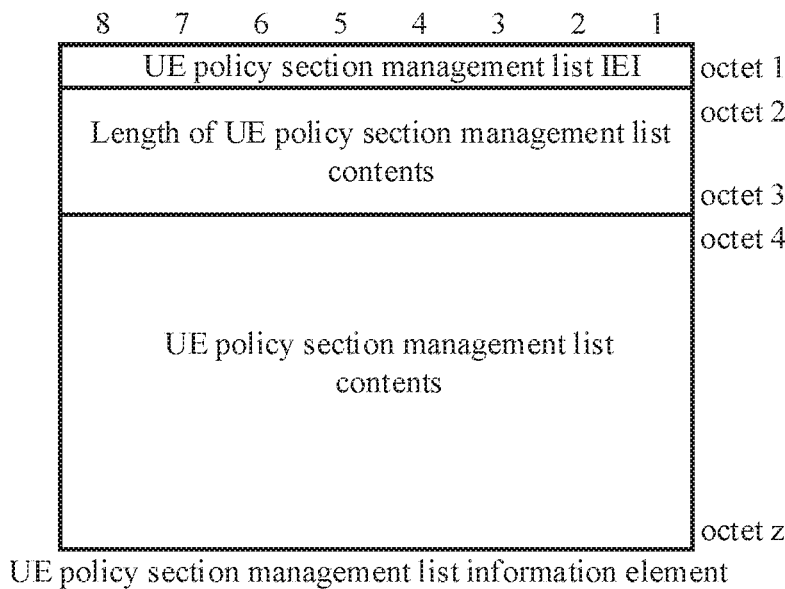

FIG. 5-1

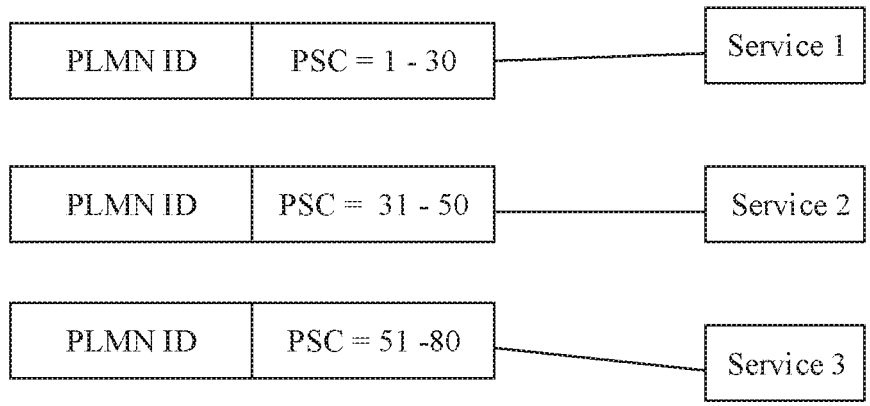
FIG. 7
UE transmits a first request message to a network device, here, the first request message includes second information and the second information is configured to instruct the network device to update a policy corresponding to at least one of a target policy type or a target service type   801
FIG. 8
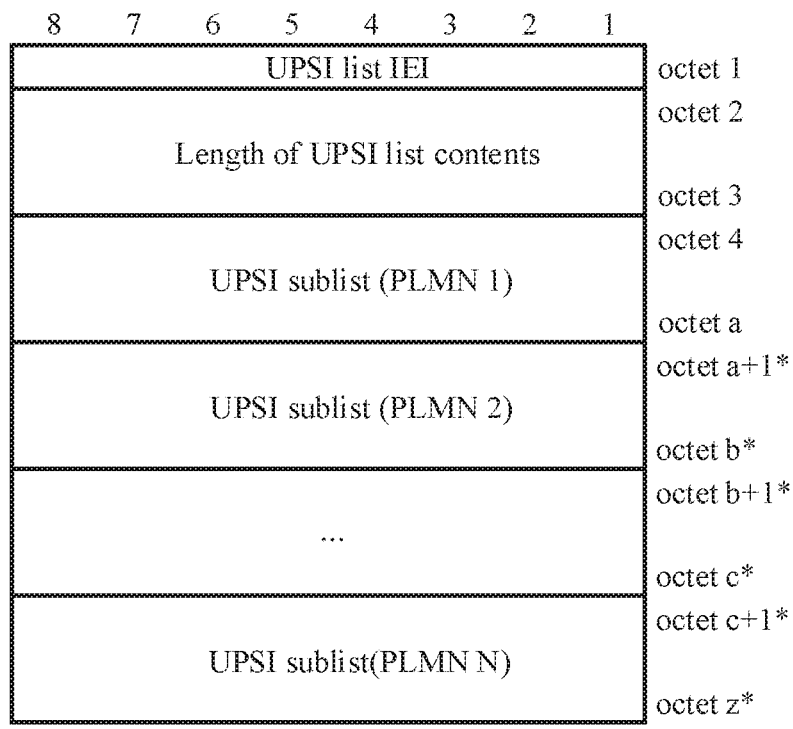
UPSI list information element
FIG. 9-1

METHOD AND DEVICE FOR POLICY DETERMINATION, AND STORAGE MEDIUM

CROSS-REFERENCE TO RELATED APPLICATIONS

The application is a continuation application of PCT Application No. PCT/CN2019/079141 filed on Mar. 21, 2019, the disclosure of which is incorporated by reference herein in its entity.

BACKGROUND

A network, when transmitting a UE policy to a UE, divides the UE policy into one or more sections for transmission, where each section corresponds to a respective Identifier (ID), i.e., a Policy Section Identifier (PSI). There are many types of UE policies. The UE, when receiving the UE policy, cannot distinguish a specific policy type corresponding to each section.

SUMMARY

The embodiments of the present disclosure relate to the field of mobile communication technologies and provide a method and device for policy determination and a storage medium.

In a first aspect, the embodiments of the present disclosure provide a method for policy determination, which includes the following operation.

A UE receives first information transmitted by a network device, here, the first information includes a first policy, and the first policy includes a policy type corresponding to the first policy; here, the network device is a Policy Control Function (PCF), a content of the first information is divided into at least one section and is encapsulated into a container by the PCF for transmitting to a Core Access and Mobility Management Function (AMF), and the container is transparently transmitted to the UE by the AMF; here, the policy type corresponding to the first policy comprises at least one of a PC5 interface-based Vehicle to Everything (V2X) policy or a Uu interface-based V2X policy.

In a second aspect, the embodiments of the present disclosure provide a method for policy determination, which includes the following operation.

A network device sends first information to a UE, here, the first information includes a first policy and the first policy includes a policy type corresponding to the first policy; here, the network device is a PCF, a content of the first information is divided into at least one section and is encapsulated into a container by the PCF for transmitting to an AMF, and the container is transparently transmitted to the UE by the AMF; here, the policy type corresponding to the first policy comprises at least one of a PC5 interface-based V2X policy or a Uu interface-based V2X policy.

In a third aspect, the embodiments of the present disclosure provide a device for policy determination, which is for use in a UE and includes a transceiver, a processor and a memory.

The memory is configured to store computer program instructions that, when executed by the processor, cause the processor to perform a method for policy determination comprising: receiving, through the transceiver, first information transmitted by a network device, here, the first information includes a first policy, and the first policy includes a policy type corresponding to the first policy; here, the network device is a PCF, a content of the first information is divided into at least one section and is encapsulated into a container by the PCF for transmitting to an AMF, and the container is transparently transmitted to the UE by the AMF; here, the policy type corresponding to the first policy comprises at least one of a PC5 interface-based V2X policy or a Uu interface-based V2X policy.

In a fourth aspect, the embodiments of the present disclosure provide a non-transitory computer readable storage medium, having stored thereon computer program instructions that, when executed by a processor of a UE, cause the processor to perform a method for policy determination comprising: receiving first information transmitted by a network device, here, the first information includes a first policy and the first policy includes a policy type corresponding to the first policy; here, the network device is a PCF, a content of the first information is divided into at least one section and is encapsulated into a container by the PCF for transmitting to an AMF, and the container is transparently transmitted to the UE by the AMF; here, the policy type corresponding to the first policy comprises at least one of a PC5 interface-based Vehicle to V2X policy or a Uu interface-based V2X policy.

BRIEF DESCRIPTION OF THE DRAWINGS

The drawings described herein are adopted to provide a further understanding to the present disclosure and form a part of the present disclosure. Schematic embodiments of the present disclosure and descriptions thereof are adopted to explain the present disclosure and not intended to form improper limitations to the present disclosure. In the drawings:

FIG. 3 is a flowchart of a UE actively making a request for a UE policy according to an embodiment of the present disclosure.

FIG. 4 is a first flowchart of a method for policy determination according to an embodiment of the present disclosure.

FIG. 5-1 is a diagram of a UE policy section management list Information Element (IE).

FIG. 5-2 is a diagram of UE policy section management list contents.

FIG. 5-3 is a diagram of a UE policy section management sublist.

FIG. 5-4 is a diagram of UE policy section management sublist contents.

FIG. 5-5 is a diagram of an Instruction.

FIG. 5-6 is a diagram of UE policy section contents.

FIG. 5-7 is a diagram of a UE policy part.

FIG. 6-1 is a first structure diagram of a PSI according to an embodiment of the present disclosure.

FIG. 6-2 is a second structure diagram of a PSI according to an embodiment of the present disclosure.

FIG. 7 is a diagram of correspondences between PSIs and service types according to an embodiment of the present disclosure.

FIG. 8 is a second flowchart of a method for policy determination according to an embodiment of the present disclosure.

FIG. 9-1 is a diagram of a UE PSI (UPSI) list information element.

FIG. 9-2 is a diagram of a UPSI sublist.

DETAILED DESCRIPTION

The technical solutions in the embodiments of the present disclosure will be described below in combination with the drawings in the embodiments of the present disclosure. It is apparent that the described embodiments are not all embodiments but part of embodiments of the present disclosure. All other embodiments obtained by those of ordinary skill in the art based on the embodiments in the present disclosure without creative work shall fall within the scope of protection of the present disclosure.

The technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD) system, a Universal Mobile Telecommunication System (UMTS), a Worldwide Interoperability for Microwave Access (WiMAX) communication system or a future 5th-Generation (5G) system.

Figure 1:
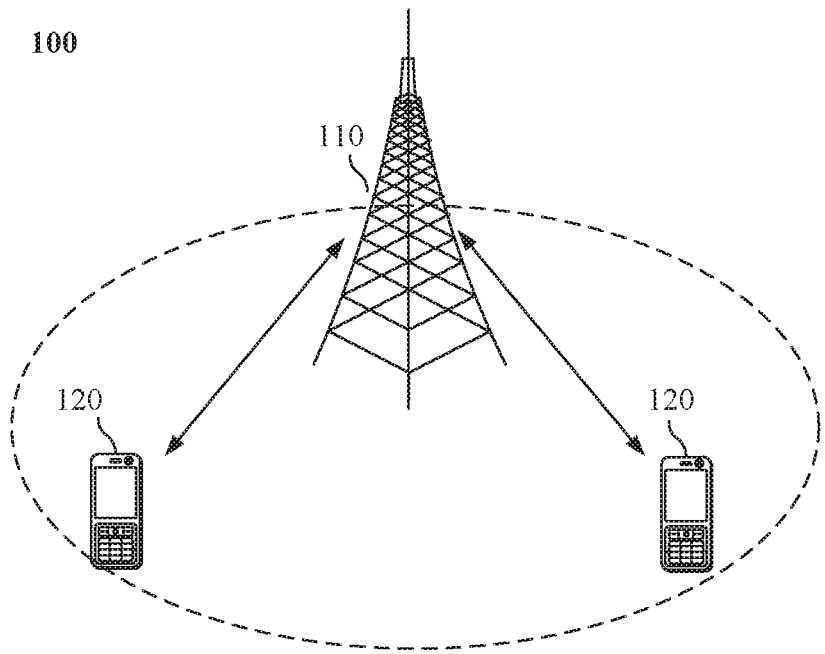
FIG. 1 is an architecture diagram of a communication system according to an embodiment of the present disclosure.

Exemplarily, a communication system 100 that the embodiments of the present disclosure are applied to is illustrated in FIG. 1. The communication system 100 may include a network device 110, and the network device 110 may be a device communicating with a terminal 120 (or called a communication terminal or a terminal). The network device 110 may provide communication coverage for a specific geographical region and may communicate with a terminal located in the coverage. Optionally, the network device 110 may be a Base Transceiver Station (BTS) in the GSM or the CDMA system, may also be a NodeB (NB) in the WCDMA system, or may further be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a 5G network, a network device in a future evolved Public Land Mobile Network (PLMN) or the like.

The communication system 100 further includes at least one terminal 120 within the coverage of the network device 110. A "terminal" used herein includes, but not limited to, a device configured to receive or send a communication signal through a wired line connection (for example, through Public Switched Telephone Network (PSTN), Digital Subscriber Line (DSL), digital cable and direct cable connections, and/or another data connection/network) and/or through a wireless interface with, for example, a cellular network, a Wireless Local Area Network (WLAN), a Digital TV network such as Digital Video Broadcasting Handheld (DVB-H) network, a satellite network, an Amplitude Modulation (AM)-Frequency Modulation (FM) broadcast transmitter and/or another communication terminal; and/or an Internet of Things (IoT) device. The UE configured to communicate through a wireless interface may be called a "wireless communication terminal", a "wireless terminal" or a "mobile terminal." Examples of a mobile terminal include, but not limited to, a satellite or cellular telephone, a Personal Communication System (PC5) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic other electronic devices including radiotelephone transceivers. The terminal may be an access terminal, User Equipment (UE), a user unit, a user station, a mobile station, a mobile platform, a remote station, a remote terminal, a mobile device, a user terminal, a terminal, a wireless communication device, a user proxy or a user device. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, a vehicle-amounted device, a wearable device, a terminal in a 5G network, or a terminal in a future evolved Public Land Mobile Network (PLMN).

Optionally, Device to Device (D2D) communication may be performed between the terminals 120.

Optionally, the 5G system or the 5G network may also be called a New Radio (NR) system or an NR network.

FIG. 1 exemplarily illustrates one network device and two terminals. Optionally, the communication system 100 may include multiple network devices and another number of terminals may be within coverage of each network device. There are not limited in the embodiments of the present disclosure.

Optionally, the communication system 100 may further include another network entity such as a network controller and a mobility management entity. There are not limited in the embodiments of the present disclosure.

It is to be understood that in the embodiments of the present disclosure, a device with a communication function in the network/system may be called a communication device. For example, for the communication system 100 illustrated in FIG. 1, communication devices may include the network device 110 and terminal 120 with the communication function, and the network device 110 and the terminal 120 may be the specific devices mentioned above and will not be elaborated herein. The communication devices may further include other devices in the communication system 100, for example, other network entities like a network controller and a mobility management entity. There are not limited in the embodiments of the present disclosure.

It is to be understood that terms "system" and "network" in the present disclosure may usually be exchanged in the present disclosure. In the present disclosure, term "and/or" is only an association relationship describing associated objects and represents that three relationships may exist. For example, A and/or B may represent three conditions: i.e., independent existence of A, existence of both A and B and independent existence of B. In addition, character "/" in the present disclosure usually represents that previous and next associated objects form an "or" relationship.

In order to make the technical solutions of the embodiments of the present disclosure convenient to understand, several types of UE policies involved in the embodiments of the present disclosure will be described at first below.

1) WLAN Selection Policy (WLANSP)

The WLANSP includes multiple rules, a rule in the WLANSP is called a WLANSP rule, and the WLANSP rule is configured for UE to select a specific WLAN access point.

2) UE Route Selection Policy (URSP)

The URSP includes multiple rules, a rule in the URSP is called a URSP rule, and each URSP rule consists of a traffic descriptor and a group of Route Selection Descriptors (RSDs). Related contents of the URSP are illustrated in Table 1 and Table 2.

TABLE 1

URSP Rule

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the traffic descriptors for the policy | | | |
| Application identifiers | Application identifier(s) | Optional | Yes | UE context |
| IP descriptors | IP 3 tuple(s) (destination IP address or IPv6 network prefix, destination port number, protocol ID of the protocol above IP) | Optional | Yes | UE context |
| Non-IP descriptors | Descriptor(s) for non-IP traffic | Optional | Yes | UE context |
| List of Route Selection Descriptors | A list of Route Selection Descriptors. The components of a Route Selection Descriptor are described in table 6.6.2-2. | Mandatory | | |

NOTE 1:
Rules in a URSP shall have different precedence values.

TABLE 2

RSD

| Information name | Description | Category | PCF permitted to modify in a UE context | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. | Optional | Yes | UE context |
| Network Slice Selection | Either one single value or a list of values of S-NSSAI(s). | Optional | Yes | UE context |
| DNN Selection | Either one single value or a list of values of DNN(s). | Optional | Yes | UE context |
| Non-seamless Offload indication | Indicates if the traffic of the matching application is to be offloaded to non-3GPP access outside of a PDU Session. | Optional (NOTE 3) | Yes | UE context |
| Access Type preference | Indicates the preferred Access Type (3GPP or non-3GPP) when the UE establishes a PDU Session for the matching application. | Optional | Yes | UE context |

NOTE 1:
Every Route Selection Descriptors in the list shall have a different precedence value.
NOTE 2:
At least one of the route selection component shall be present.
NOTE 3:
If this indication is present in a Route Selection Descriptor, no other components shall be included in the Route Selection Descriptor.

3) Vehicle to Everything (V2X) Policy

In addition to the URSP and the WLANSP, types of UE policies may also be distinguished in terms of purpose. For example, some UE policies are configured for Enhanced Mobile Broadband (eMBB) services, and some UE policies are configured for V2X services. Furthermore, V2X policies are divided into PC5 interface-based policies and Uu interface-based policies.

Figure 2:
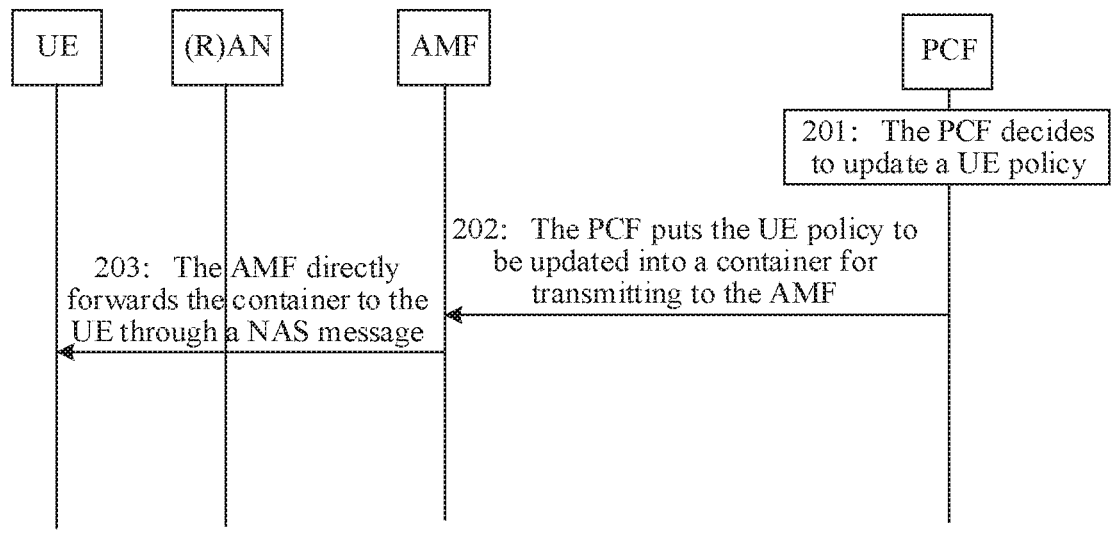
FIG. 2 is a flowchart of configuration of a UE policy according to an embodiment of the present disclosure.

Configuration of a UE policy is implemented through a UE Configuration Update (UCU) procedure. As illustrated in FIG. 2, the procedure includes the following operations.

In 201, a Policy Control Function (PCF) decides to update a UE policy.

In 202, the PCF puts the UE policy to be updated into a container for transmitting to a Core Access and Mobility Management Function (AMF).

In 203, the AMF directly forwards the container to a UE through a Non-Access Stratum (NAS) message.

Figures 2, 5:
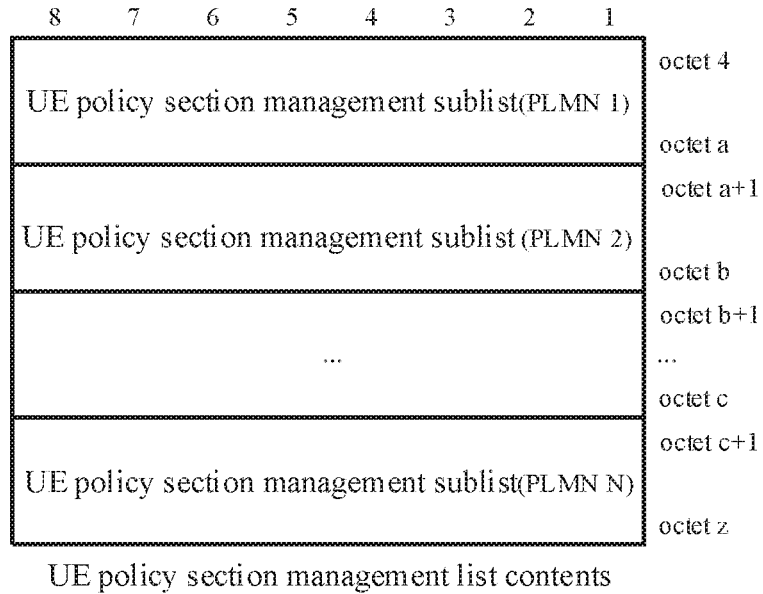
Figures 3, 5:
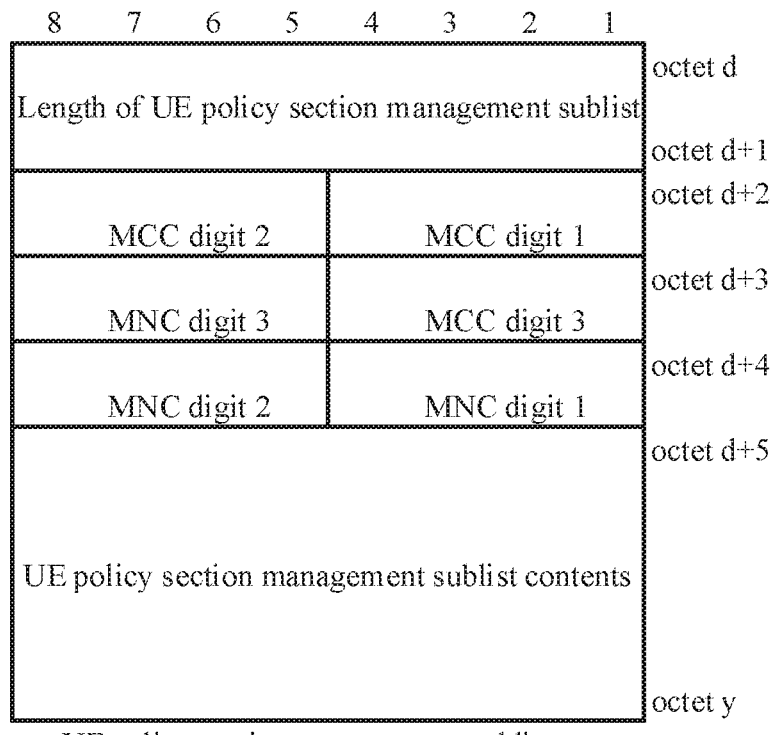

The 3rd Generation Partnership Project (3GPP) specifies a procedure of a UE actively making a request for a UE policy. As illustrated in FIG. 3, the procedure includes the following operations.

In 301, the UE sends a UE policy request message to an AMF.

In 302, the AMF sends a UE policy control update message to a PCF.

In 303, a UE policy configuration procedure is performed between the UE and the PCF.

Herein, the UE policy configuration procedure refers to the procedure illustrated in FIG. 2.

It is to be noted that UE may simultaneously receive multiple types of UE policies such as a URSP policy and a V2X policy from a network side. On the other hand, the procedure of the UE actively making the request for the UE policy as illustrated in FIG. 3 is only adopted for a request for a UE policy for a V2X service (i.e., a V2X policy).

Figures 4, 5:
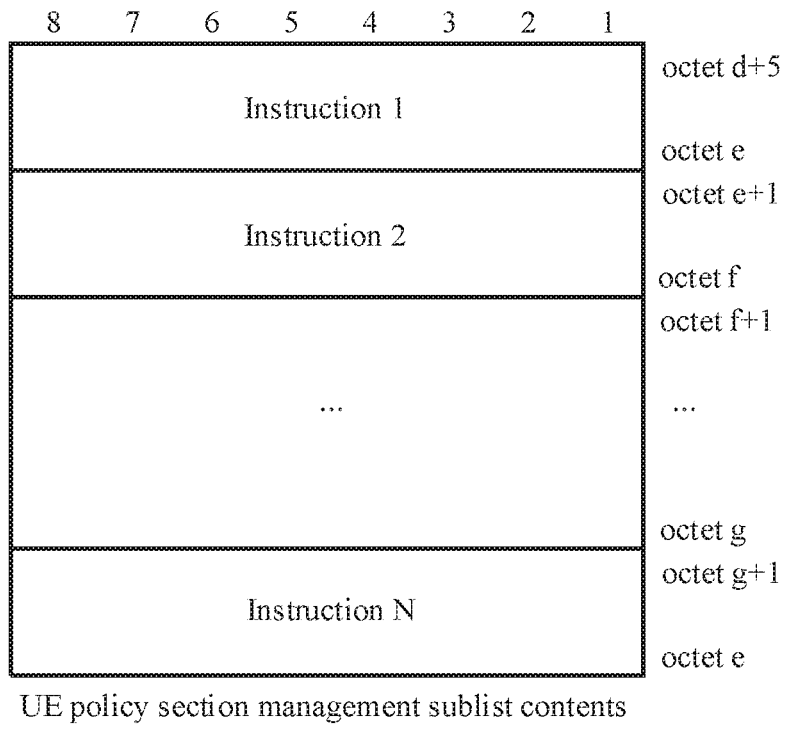
Figure 5:
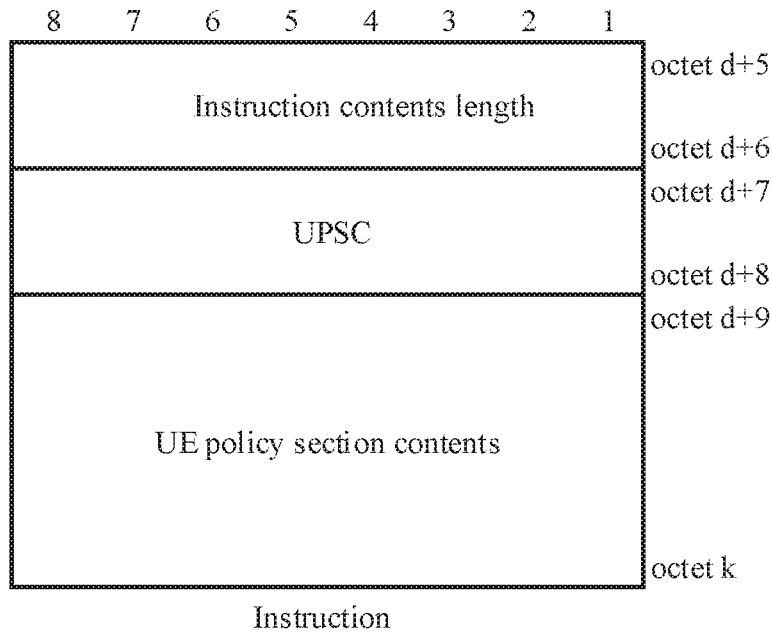

FIG. 4 is a first flowchart of a method for policy determination according to an embodiment of the present disclosure. As illustrated in FIG. 4, the method for policy determination includes the following operation.

In 401, a UE receives first information transmitted by a network device, here, the first information includes at least one of: a first policy, a policy type corresponding to the first policy, a service type corresponding to the first policy, indication information indicative of whether the UE is allowed to request the first policy, or a trigger condition for the UE to request the first policy.

In the embodiment of the present disclosure, the UE may be any device capable of communicating with a network, such as a mobile phone, a tablet computer, a notebook computer, a vehicle terminal or a wearable device.

In the embodiment of the present disclosure, the first policy is a UE policy. The policy type corresponding to the first policy includes at least one of: a V2X policy, an Ultra Reliable and Low Latency Communication (URLLC) policy, a Cognitive Internet of Things (CIoT) policy, a WLANSP, a URSP, or a background data transmission policy. The service type corresponding to the first policy includes at least one of: a V2X service, a URLLC service, an IoT service, or a background data transmission service.

It is to be noted that the policy type means that the name of the policy is different. For example, a policy for session binding is called a URSP, a policy for WLAN access point selection is called a WLANSP, and a policy for V2X is called a V2X policy. The service type means that the name of the policy may be the same but services corresponding to different policies or different policy sections (services for which these policies or policy sections are used) are different. For example, a policy for V2X corresponds to a V2X service, a policy for IoT corresponds to an IoT service, and a policy for URLLC corresponds to a URLLC service. UE policies may correspond to different types of services.

Figures 5, 6:
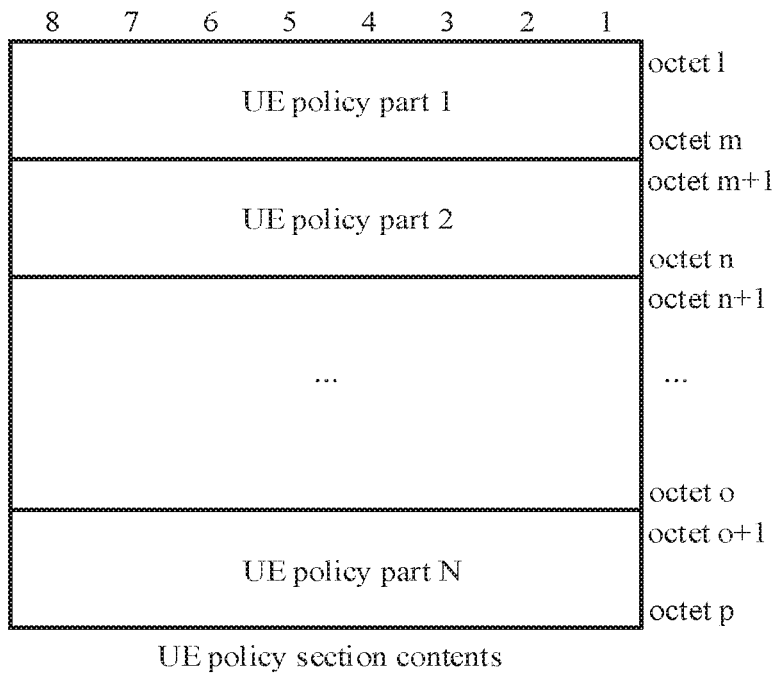
Figures 5, 6, 7:
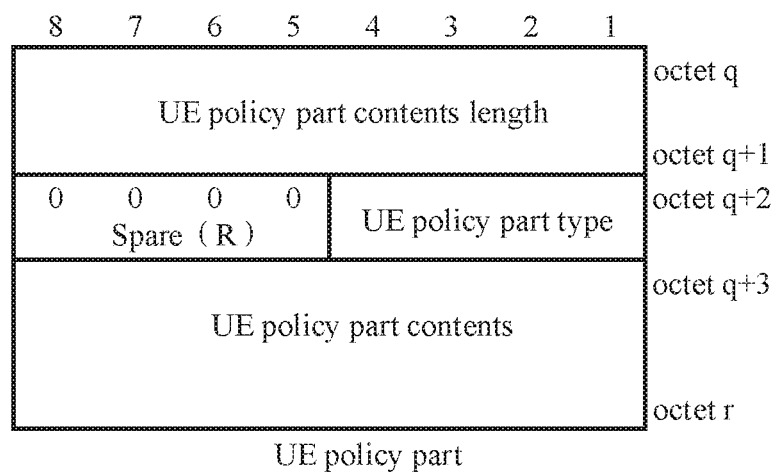
Figures 1, 6:
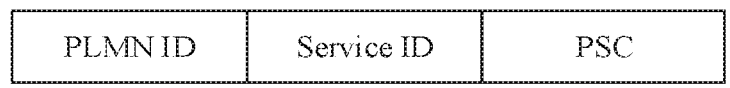
Figures 2, 6:
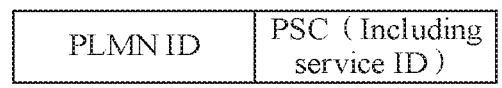

In the embodiment of the present disclosure, the UE policy is transmitted through the following manner: the network device divides the UE policy into one or more sections for transmitting to the UE, where each section corresponds to a respective PSI. A compiling format of a content of the UE policy will be described below. The compiling format of the content of the UE policy is used in the condition that a network side transmits the UE policy to the UE (see the procedure illustrated in FIG. 2). The compiling format of the UE policy is illustrated in FIG. 5-1 to FIG. 5-7. FIG. 5-1 illustrates a UE policy section management list information element, including a length of a UE policy section management list and UE policy section management list contents. Furthermore, FIG. 5-2 illustrates the UE policy section management list contents, including N UE policy section management sublists. Furthermore, FIG. 5-3 illustrates a UE policy section management sublist, including a PLMN and UE policy section management sublist contents, where the PLMN consists of a Mobile Country Code (MCC) and a Mobile Network Code (MNC). Furthermore, FIG. 5-4 illustrates the UE policy section management sublist contents, including N instructions. Furthermore, FIG. 5-5 illustrates an instruction, including an instruction contents length, a UE Policy Section Code (UPSC) and UE policy section contents. Furthermore, FIG. 5-6 illustrates the UE policy section contents, including N UE policy parts. Furthermore, FIG. 5-7 illustrates a UE policy part, including a UE policy part contents length, a spare bit, a UE policy part type and UE policy part contents.

In the embodiment of the present disclosure, the UE may recognize the policy type corresponding to the obtained first policy. For achieving this purpose, the following implementation manners are adopted.

A first manner: a policy content of the first policy includes first indication information, and the first indication information is configured to indicate at least one of the policy type or the service type corresponding to the first policy. Furthermore, at least one of a policy type field or a spare bit field in the policy content of the first policy includes the first indication information.

For example, the UE policy consists of a policy ID and a policy content, the first indication information is added into the policy content, and the first indication information includes at least one of service information or policy type information. Referring to FIG. 5 to FIG. 7, new values may be added into at least one of a "UE policy part type" field (i.e., the policy type field) or a spare bit field (i.e., the spare bit field) to distinguish the policy type.

A second manner: a policy ID of the first policy includes second indication information, and the second indication information indicates at least one of the policy type or the service type corresponding to the first policy. Furthermore, the policy ID of the first policy includes a PLMN ID, the second indication information and a Policy Section Code (PSC); or, the policy ID of the first policy includes a PLMN ID and a PSC, the PSC includes the second indication information.

Specifically, considering that the UE policy may be divided into one or more sections, each section may be identified with a PSI, and the PSI consists of a PLMN ID and a PSC, thus the second indication information is added into the PSI, and the second indication information includes at least one of service information or policy type information. Referring to FIG. 6-1 and FIG. 6-2, in FIG. 6-1, the PSI consists of a PLMN ID, a service ID and a PSC; and in FIG. 6-2, the PSI consists of a PLMN ID and a PSC, and the PSC further contains a service ID.

A third manner: values of a policy ID have first correspondences with policy types, and the first correspondences are used by the UE to determine at least one of the policy type or the service type corresponding to the first policy based on a policy ID of the first policy.

Herein, the policy ID includes a PLMN ID and a PSC.

For example, it may be agreed in a protocol that a value range of the PSI of the UE policy corresponds to a specific service, namely corresponding to a specific policy type. Referring to FIG. 7, for the PSI (PLMN ID+PSC), it is agreed that different values of the PSI correspond to different service types. PSC=1-30 corresponds to a service 1, PSC=31-50 corresponds to a service 2, and PSC=51-80 corresponds to a service 3.

A fourth manner: the first information includes a first parameter, the first parameter is configured to indicate a correspondence between the first policy and at least one of the policy type or the service type; and the UE determines the at least one of the policy type or the service type corresponding to the first policy based on the first parameter.

Herein, the correspondence between the first policy and the at least one of the policy type or the service type includes at least one of:

a correspondence between at least one policy ID and the at least one of the policy type or the service type;

a correspondence between at least one policy rule and the at least one of the policy type or the service type; or a correspondence between at least one policy section and the at least one of the policy type or the service type.

Herein, the policy ID includes a PLMN ID and a PSC.

Herein, a new parameter may be added to indicate service information, i.e., policy type information. For example, the first parameter is added to indicate that one or more UE policy sections correspond to a specific service. In an example, the first parameter may indicate the following information: PSC1-PSC10 correspond to a service 1; PSC15, PSC20 and PSC24-26 correspond to a service 2; PSC50 and PSC65 correspond to a service 3.

The network device, when transmitting the UE policy to the UE, directly notify the first parameter to the UE.

A fifth manner: service attribute information of policies has second correspondences with policy types, and the second correspondences are used by the UE to determine at least one of the policy type or the service type corresponding to the first policy based on service attribute information of the first policy. Furthermore, the service attribute information includes at least one of: Single-Network Slice Selection Assistant Information (S-NSSAI), a Data Network Name (DNN), an Internet Protocol (IP) address, a Media Access Control (MAC) address, an application ID, or a session type.

Specifically, since the policy contains the service attribute information such as the S-NSSAI and the DNN, the UE may distinguish the policy type corresponding to the policy according to the existing service attribute information.

For example, S-NSSAI of policy section-1 corresponds to a URLLC service, and policy section-1 is a URLLC policy; and S-NSSAI of policy section-2 corresponds to a V2X service, and policy section-2 is a V2X policy.

In the embodiment of the present disclosure, the network device is a PCF, the first information is encapsulated into a container by the PCF for transmitting to an AMF, and the container is transparently transmitted to the UE by the AMF. Furthermore, the container is transmitted to the UE by the AMF through a NAS message. Herein, the NAS message may be a downlink NAS transport message.

Through the technical solution of the embodiment of the present disclosure, the UE may learn about the policy type corresponding to the first policy, and the UE, when requesting a policy of a specific policy type (or specific service) from the network device, may transmit a first request message to the network side and instruct the network side to update the policy corresponding to the specific policy type (or specific service).

In the embodiment of the present disclosure, the trigger condition for the UE to request the first policy includes at least one of: a time from which the first policy expires, a duration in which the first policy is valid, a time at which the first request message is initiated, a time period during which the first request message is initiated, or location information for initiating the first request message. The UE determines when to transmit the first request message to the network device according to the trigger condition.

How UE pertinently requests a policy corresponding to a specific policy type (or specific service) from a network will be described below.

FIG. 8 is a second flowchart of a method for policy determination according to an embodiment of the present disclosure. As illustrated in FIG. 8, the method for policy determination includes the following operation.

In 801, a UE transmits a first request message to a network device, here, the first request message includes second information and the second information is configured to instruct the network device to update a policy corresponding to at least one of a target policy type or a target service type.

It is to be noted that the at least one of "the target policy type" and/or "the target service type" in the embodiment of the present disclosure means that at least one of a policy type or a service type corresponding to a policy that needs to be updated and that is requested by the UE from a network side.

It is to be noted that before the UE transmits the first request message to the network device, the network device may send, to the UE, at least one of: indication information indicative of whether the UE is allowed to request the policy or indication information indicative of a specific policy (policies) that the UE is allowed to request. Herein, related descriptions of "allowed" may also be replaced with "required".

In the embodiment of the present disclosure, the second information may be implemented through any one of the following manners.

A first manner: the second information includes a policy ID corresponding to the at least one of the target policy type or the target service type.

Specifically, when the UE, in the condition that the UE needs to actively update the policy or in the condition that the UE requests registration, report a stored PSI, the UE may only report a PSI list corresponding to a specific policy type (or specific service) when reporting PSI list without reporting all locally stored PSI lists. For example, the UE only reports a PSI list corresponding to a V2X policy (V2X service) to the network side, and thus the network side may only update a UE policy (i.e., V2X policy) related to a V2X service.

Referring to the procedure of the UE actively making the request for the UE policy in FIG. 3, in 301, a UE policy request message transmitted to an AMF by the UE contains the policy ID corresponding to the at least one of the target policy type or the target service type (or a policy ID corresponding to a target service).

A second manner: the second information includes a policy ID stored by the UE and the at least one of the target policy type or the target service type.

Specifically, when the UE, in the condition that the UE needs to actively update the policy or in the condition that the UE requests registration, reports a stored PSI, the UE also reports PSIs corresponding to other services when reporting PSI list (namely the UE reports PSI lists corresponding to all the services) and reports a specific policy type (or specific service information), and thus the network side may only update a policy corresponding to the specific policy type (or specific service information) for the UE. For example, the UE reports, to the network side, all the stored PSIs along with indication information of the V2X policy (V2X service), and thus the network side may only update the UE policy (i.e., V2X policy) related to the V2X service.

A third manner: the second information includes the at least one of the target policy type or the target service type.

Specifically, when the UE needs to actively update the policy, the UE reports the at least one of the target policy type or the target service type. For example, the UE reports indication information of the V2X policy (V2X service) to the network side, and thus the network side may only update the UE policy (i.e., V2X policy) related to the V2X service.

Referring to the procedure of the UE actively making the request for the UE policy in FIG. 3, in 301, a UE policy request message transmitted to an AMF by the UE contains the target policy type (or target service information).

In the embodiment of the present disclosure, the network device is a PCF, the second information is encapsulated into a container by the UE for transmitting to an AMF, and the container is transparently transmitted to the PCF by the AMF. Furthermore, the container is transmitted to the AMF by the UE through a NAS message. Herein, the NAS message may be an uplink NAS transport message.

Figures 2, 9:
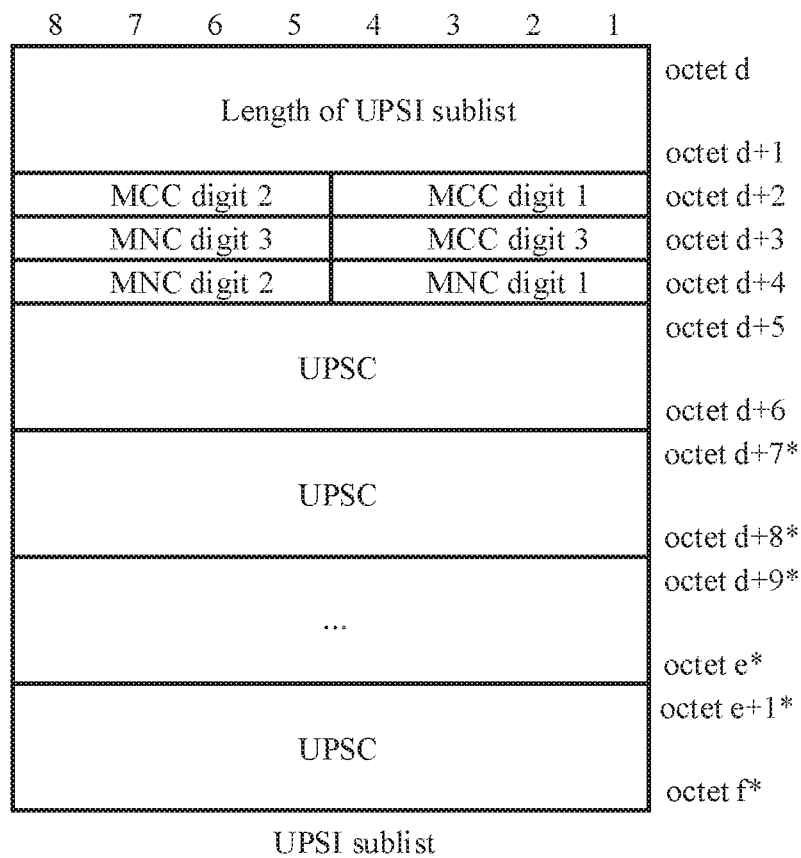

In the solution above, the PSI is also called a UPSI, and the PSI consists of a PLMN ID and a PSC. The UE, when performing a registration procedure or performing a procedure of actively applying for the UE policy, may contain, in the NAS message transmitted to the network side, a PSI list (PSI lists) stored by UE itself, and then the network side may know about a specific policy (policies) stored in the UE and accordingly implement updating. A compiling format of the PSI list is illustrated in FIG. 9-1 and FIG. 9-2. FIG. 9-1 illustrates a UPSI list information element, including length information of PSI list contents and N UPSI sublists. Furthermore, FIG. 9-2 illustrates a UPSI sublist, including length information of the UPSI sublist, a PLMN and a UPSC, and the PLMN consists of an MCC and an MNC.

According to the technical solution of the embodiment of the present disclosure, policy information includes policy type information (or service information), which is favorable for the UE to judge a policy type of a policy, thereby pertinently requesting the network to update a policy of a specific policy type. According to the technical solution of the embodiment of the present disclosure, an existing parameter and procedure are fully utilized, and an impact on an existing system is small.

It is to be noted that the technical solution related to FIG. 8 and the technical solution related to FIG. 4 may be combined for implementation or may also be independently implemented.

Figure 10:
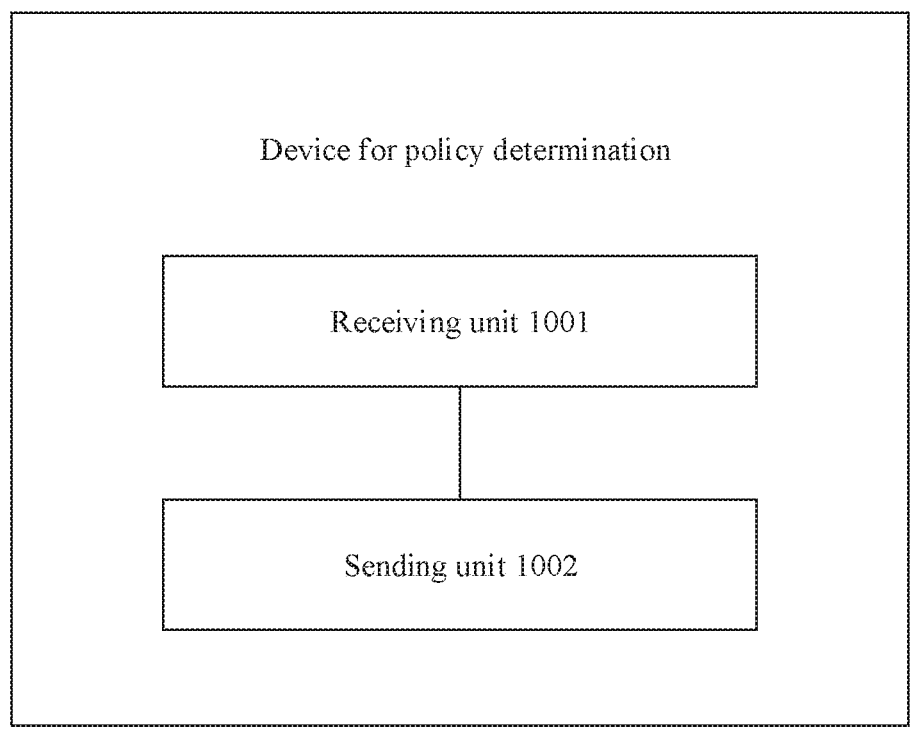
FIG. 10 is a first structure composition diagram of a device for policy determination according to an embodiment of the present disclosure.

FIG. 10 is a first structure composition diagram of a device for policy determination according to an embodiment of the present disclosure. As illustrated in FIG. 10, the device for policy determination includes a receiving unit 1001.

The receiving unit 1001 is configured to receive first information transmitted by a network device, the first information includes at least one of: a first policy, a policy type corresponding to the first policy, a service type corresponding to the first policy, indication information indicative of whether UE is allowed to request the first policy, or a trigger condition for the UE to request the first policy.

In an implementation mode, a policy content of the first policy includes first indication information, and the first indication information is configured to indicate at least one of the policy type or the service type corresponding to the first policy.

In an implementation mode, at least one of a policy type field or a spare bit field in the policy content of the first policy includes the first indication information.

In an implementation mode, a policy ID of the first policy includes second indication information, and the second indication information is configured to indicate at least one of the policy type or the service type corresponding to the first policy.

In an implementation mode, the policy ID of the first policy includes a PLMN ID, the second indication information and a PSC; or, the policy ID of the first policy includes a PLMN ID and a PSC, the PSC including the second indication information.

In an implementation mode, values of a policy ID have first correspondences with policy types.

The first correspondences are used by the UE to determine at least one of the policy type or the service type corresponding to the first policy based on a policy ID of the first policy.

In an implementation mode, the first information includes a first parameter, and the first parameter is configured to indicate a correspondence between the first policy and at least one of the policy type or the service type.

The first parameter is used by the UE to determine the at least one of the policy type or the service type corresponding to the first policy.

In an implementation mode, the correspondence between the first policy and the at least one of the policy type or the service type includes at least one of:

a correspondence between at least one policy ID and the at least one of the policy type or the service type;

a correspondence between at least one policy rule and the at least one of the policy type or the service type; and a correspondence between at least one policy section and the at least one of the policy type or the service type.

In an implementation mode, the policy ID includes a PLMN ID and a PSC.

In an implementation mode, service attribute information of policies has second correspondences with policy types.

The second correspondences are used by the UE to determine at least one of the policy type or the service type corresponding to the first policy based on service attribute information of the first policy.

In an implementation mode, the service attribute information includes at least one of: S-NSSAI, a DNN, an IP address, a MAC address, an application ID, or a session type.

In an implementation mode, the trigger condition for the UE to request the first policy includes at least one of:

a time from which the first policy expires, a duration in which the first policy is valid, a time at which a first request message is initiated, a time period during which the first request message is initiated, or location information for initiating the first request message.

In an implementation mode, the device further includes a sending unit 1002.

The sending unit 1002 is configured to transmit a first request message to the network device, here, the first request message includes second information and the second information is configured to instruct the network device to update a policy corresponding to at least one of a target policy type or a target service type.

In an implementation mode, the second information includes a policy ID corresponding to the at least one of the target policy type or the target service type.

In an implementation mode, the second information includes a policy ID stored by the UE and the at least one of the target policy type or the target service type.

In an implementation mode, the second information includes the at least one of the target policy type or the target service type.

In an implementation mode, the network device is a PCF, the first information is encapsulated into a container by the PCF for transmitting to an AMF, and the container is transparently transmitted to the UE by the AMF.

In an implementation mode, the container is transmitted to the UE by the AMF through a NAS message.

In an implementation mode, the network device is a PCF, the second information is encapsulated into a container by the UE for transmitting to an AMF, and the container is transparently transmitted to the PCF by the AMF.

In an implementation mode, the container is transmitted to the AMF by the UE through a NAS message.

In an implementation mode, the policy type corresponding to the first policy includes at least one of: a V2X policy, a URLLC policy, a CIoT policy, a WLANSP, a URSP, or a background data transmission policy.

The service type corresponding to the first policy includes at least one of: a V2X service, a URLLC service, an IoT service, or a background data transmission service.

It is understood by those skilled in the art that the related descriptions about the device for policy determination in the embodiments of the present disclosure may be understood with reference to the related descriptions about the method for policy determination in the embodiments of the present disclosure.

Figure 11:
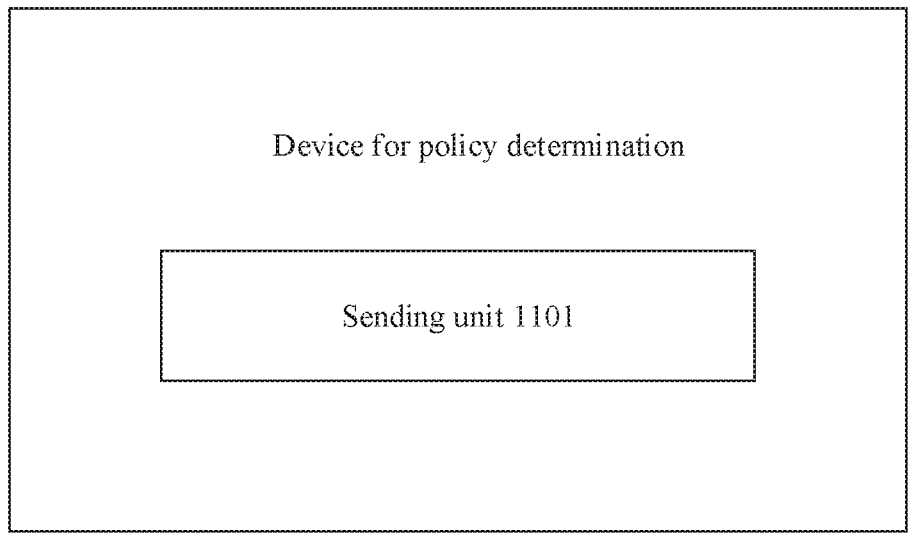
FIG. 11 is a second structure composition diagram of a device for policy determination according to an embodiment of the present disclosure.

FIG. 11 is a second structure composition diagram of a device for policy determination according to an embodiment of the present disclosure. As illustrated in FIG. 11, the device for policy determination includes a sending unit 1101.

The sending unit 1101 is configured to transmit a first request message to a network device, here, the first request message includes second information and the second information is configured to instruct the network device to update a policy corresponding to at least one of a target policy type or a target service type.

In an implementation mode, the second information includes a policy ID corresponding to the at least one of the target policy type or the target service type.

In an implementation mode, the second information includes a policy ID stored by UE and the at least one of the target policy type or the target service type.

In an implementation mode, the second information includes the at least one of the target policy type or the target service type.

In an implementation mode, the network device is a PCF, the second information is encapsulated into a container by the UE for transmitting to an AMF, and the container is transparently transmitted to the PCF by the AMF.

In an implementation mode, the container is transmitted to the AMF by the UE through a NAS message.

It is understood by those skilled in the art that the related descriptions about the device for policy determination in the embodiments of the present disclosure may be understood with reference to the related descriptions about the method for policy determination in the embodiments of the present disclosure.

Figure 12:
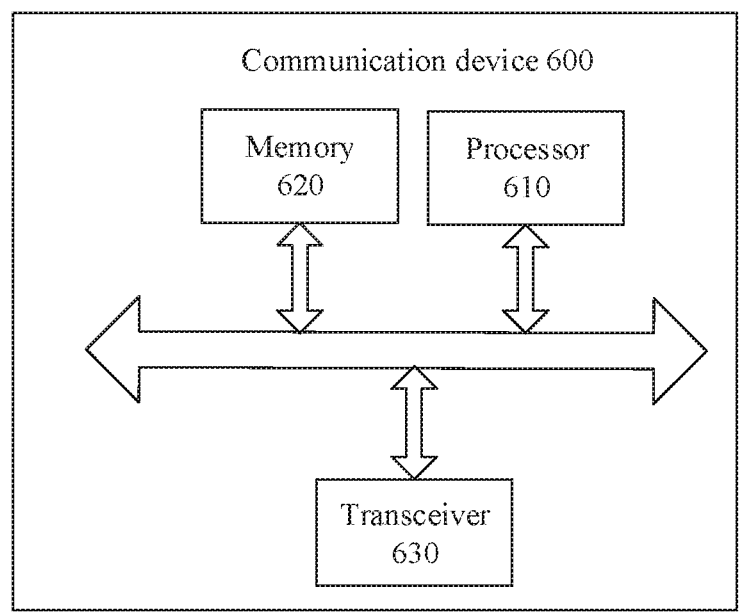
FIG. 12 is a structure diagram of a communication device according to an embodiment of the present disclosure.

FIG. 12 is a structure diagram of a communication device 600 according to an embodiment of the present disclosure. The communication device may be a UE or may also be a network device. The communication device 600 illustrated in FIG. 12 includes a processor 610, and the processor 610 may call and run computer programs in a memory to perform the methods in the embodiments of the present disclosure.

Optionally, as illustrated in FIG. 12, the communication device 600 may further include the memory 620. The processor 610 may call and run the computer programs in the memory 620 to perform the methods in the embodiments of the present disclosure.

The memory 620 may be a separate device independent of the processor 610 or may also be integrated into the processor 610.

Optionally, as illustrated in FIG. 12, the communication device 600 may further include a transceiver 630, and the processor 610 may control the transceiver 630 to communicate with another device, specifically transmitting information or data to the another device or receiving information or data transmitted by the another device.

The transceiver 630 may include a transmitter and a receiver. The transceiver 630 may further include antennae, and the number of the antennae may be one or more.

Optionally, the communication device 600 may specifically be a network device of the embodiments of the present disclosure, and the communication device 600 may implement corresponding flows implemented by the network device in each method of the embodiments of the present disclosure. For simplicity, elaborations are omitted herein.

Optionally, the communication device 600 may specifically be the mobile terminal/UE of the embodiments of the present disclosure, and the communication device 600 may implement corresponding flows implemented by the mobile terminal/UE in each method of the embodiments of the present disclosure. For simplicity, elaborations are omitted herein.

Figure 13:
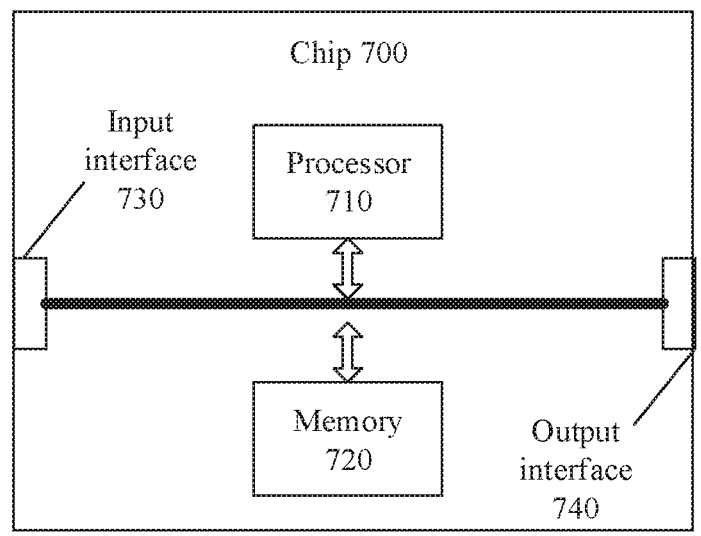
FIG. 13 is a structure diagram of a chip according to an embodiment of the present disclosure.

FIG. 13 is a structure diagram of a chip according to an embodiment of the present disclosure. The chip 700 illustrated in FIG. 13 includes a processor 710, and the processor 710 may call and run computer programs in a memory to perform the methods in the embodiments of the present disclosure.

Optionally, as illustrated in FIG. 13, the chip 700 may further include the memory 720. The processor 710 may call and run the computer programs in the memory 720 to perform the methods in the embodiments of the present disclosure.

The memory 720 may be a separate device independent of the processor 710 or may also be integrated into the processor 710.

Optionally, the chip 700 may further include an input interface 730. The processor 710 may control the input interface 730 to communicate with another device or chip, specifically acquiring information or data transmitted by the another device or chip.

Optionally, the chip 700 may further include an output interface 740. The processor 710 may control the output interface 740 to communicate with another device or chip, specifically outputting information or data transmitted by the another device or chip.

Optionally, the chip may be applied to the network device of the embodiments of the present disclosure, and the chip may implement corresponding flows implemented by the network device in each method of the embodiments of the present disclosure. For simplicity, elaborations are omitted herein.

Optionally, the chip may be applied to the mobile terminal/UE of the embodiments of the present disclosure, and the chip may implement corresponding flows implemented by the mobile terminal/UE in each method of the embodiments of the present disclosure. For simplicity, elaborations are omitted herein.

It is to be understood that the chip mentioned in the embodiments of the present disclosure may also be called a system-level chip, a system chip, a chip system or a system on chip, etc.

Figure 14:
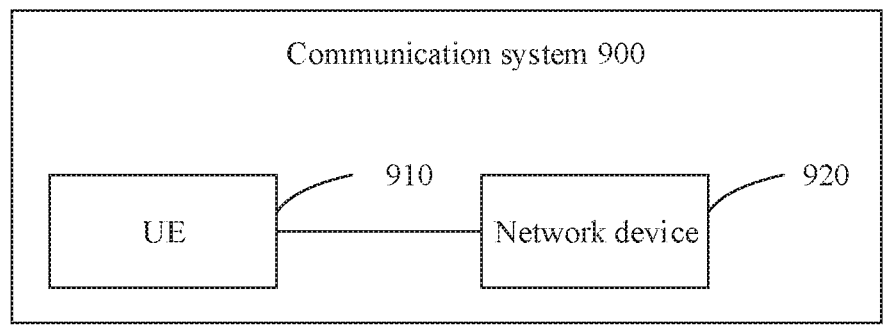
FIG. 14 is a block diagram of a communication system according to an embodiment of the present disclosure.

FIG. 14 is a second block diagram of a communication system 900 according to an embodiment of the present disclosure. As illustrated in FIG. 14, the communication system 900 includes a UE 910 and a network device 920.

The UE 910 may be configured to realize corresponding functions realized by the UE in the methods above, and the network device 920 may be configured to realize corresponding functions realized by the network device in the methods above. For simplicity, elaborations are omitted herein.

It should be understood that the processor in the embodiments of the disclosure may be an integrated circuit chip and has a signal processing capability. In the implementation process, each operation of the foregoing method embodiments may be completed by an integrated logic circuit of hardware in a processor or instructions in a form of software in a processor. The above processor may be a general-purpose processor, a Digital Signal Processor (DSP), an Application Specific Integrated Circuit (ASIC), a Field Programmable Gate Array (FPGA) or another Programming logic devices, a discrete gate or transistor logic device, a discrete hardware component, or the like. Various methods, operations, and logical blocks disclosed in the embodiments of the present disclosure can be implemented or executed. A general-purpose processor may be a microprocessor or the processor may be any conventional processor or the like. The operations of the methods disclosed in combination with the embodiments of the present disclosure may be directly implemented by a hardware decoding processor, or may be implemented by a combination of hardware and software modules in the decoding processor. The software modules may be located in a mature storage medium in the art, such as a Random Access Memory (RAM), a flash memory, a Read-Only Memory (ROM), a Programmable Read-Only Memory (PROM), an Erasable Programmable Read-Only Memory (EPROM), an Electrically Erasable Programmable Read-Only Memory (EEPROM), a register, and the like. The storage medium is located in a memory, and the processor reads the information in the memory and completes the operations of the foregoing methods in combination with the hardware of the processor.

It should be understood that the memory in the embodiments of the present disclosure may be a volatile memory or a non-volatile memory, or may include the volatile memory and the non-volatile memory. The non-volatile memory may be a ROM, a PROM, an EPROM, EEPROM or a flash memory, or the like. The volatile memory may be a RAM, which is used as an external cache. By way of example, but not limitation, many forms of RAMs are available, such as a Static Random Access Memory (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described herein is intended to include, but is not limited to, these and any other suitable types of memory.

It should be understood that the above memory are exemplary but not restrictive. For example, the memory in the embodiments of the present disclosure may also be a Static RAM (SRAM), a Dynamic RAM (DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM), etc. That is, the memories in the embodiments of the present disclosure are intended to include, but not limited to, these and any other suitable types of memories.

The embodiments of the present disclosure further provide a computer-readable storage medium for storing computer programs.

Optionally, the computer-readable storage medium may be applied to the network device in the embodiments of the present disclosure, and the computer programs cause a computer to execute the corresponding processes implemented by the network device in each method in the embodiments of the present disclosure. For simplicity, details are not described herein again.

Optionally, the computer-readable storage medium may be applied to the mobile terminal/UE in the embodiments of the present disclosure, and the computer programs cause a computer to execute the corresponding processes implemented by the mobile terminal/UE in each method in the embodiments of the present disclosure. For simplicity, details are not described herein again.

The embodiments of the present disclosure further provide a computer program product including computer program instructions.

Optionally, the computer program product can be applied to the network device in the embodiments of the present disclosure, and the computer program instructions cause a computer to execute the corresponding processes implemented by the network device in each method in the embodiments of the present disclosure. For simplicity, details are not described herein again.

Optionally, the computer program product can be applied to the mobile terminal/UE in the embodiments of the present disclosure, and the computer program instructions cause a computer to execute the corresponding processes implemented by the mobile terminal/UE in each method in the embodiments of the present disclosure. For simplicity, details are not described herein again.

The embodiments of the present disclosure further provide a computer program.

Optionally, the computer program can be applied to the network device in the embodiments of the present disclosure, and when run on a computer, causes the computer to execute the corresponding processes implemented by the network device in each method in the embodiments of the present disclosure. For simplicity, details are not described herein again.

Optionally, the computer program can be applied to the mobile terminal/UE in the embodiments of the present disclosure, and when run on a computer, causes the computer to execute the corresponding processes implemented by the mobile terminal/UE in each method in the embodiments of the present disclosure. For simplicity, details are not described herein again.

A person of ordinary skill in the art may be aware that example units and algorithm operations described in combination with the embodiments of in present disclosure may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that for the purpose of convenient and brief description, detailed working processes of the foregoing system, device, and unit may refer to corresponding processes in the foregoing method embodiments, and details are not described herein again.

In the several embodiments provided in the present disclosure, it should be understood that the disclosed system, device, and method may be implemented in other manners. For example, the described device embodiments are merely examples. For example, the unit division is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the solutions of the embodiments of the disclosure.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device, or the like) to perform all or some of the operations described in the embodiments of the disclosure. The foregoing storage medium includes: any medium that can store program codes, such as a USB flash drive, a removable hard disk, a ROM, a RAM, a magnetic disk, or a compact disc.

The foregoing descriptions are merely specific implementations of the disclosure, but are not intended to limit the scope of protection of the disclosure. Any variation or replacement readily figured out by a person skilled in the art within the technical scope disclosed in the disclosure shall fall within the scope of protection of the present disclosure. Therefore, the scope of protection of the present disclosure shall be subject to the scope of protection of the claims.

The invention claimed is:

1. A method for policy determination, comprising:
receiving, by User Equipment (UE), first information transmitted by a network device, the first information comprising a first policy, the first policy comprising a policy identifier (ID) and a policy content, and the policy content comprising at least one of a policy type field or a spare bit field for indicating a policy type corresponding to the first policy;
wherein the network device is a Policy Control Function (PCF), a content of the first information is divided into at least one section and is encapsulated into a container by the PCF for transmitting to a Core Access and Mobility Management Function (AMF), and the container is transparently transmitted to the UE by the AMF;
wherein the policy type corresponding to the first policy comprises at least one of a PC5 interface-based Vehicle to Everything (V2X) policy or a Uu interface-based V2X policy.

2. The method of claim 1, wherein the first information further comprises: a trigger condition for the UE to request the first policy.

3. The method of claim 1, further comprising:
transmitting, by the UE, a first request message to the network device, the first request message comprising second information and the second information being configured to instruct the network device to update a policy corresponding to a target policy type;
wherein the target policy type comprises the at least one of the PC5 interface-based V2X policy or the Uu interface-based V2X policy.

4. A method for policy determination, comprising:
transmitting, by a network device, first information to User Equipment (UE), the first information comprising a first policy, the first policy comprising a policy identifier (ID) and a policy content, and the policy content comprising at least one of a policy type field or a spare bit field for indicating a policy type corresponding to the first policy;
wherein the network device is a Policy Control Function (PCF), a content of the first information is divided into at least one section and is encapsulated into a container by the PCF for transmitting to a Core Access and Mobility Management Function (AMF), and the container is transparently transmitted to the UE by the AMF;
wherein the policy type corresponding to the first policy comprises at least one of a PC5 interface-based Vehicle to Everything (V2X) policy or a Uu interface-based V2X policy.

5. The method of claim 4, wherein the first information further comprises: a trigger condition for the UE to request the first policy.

6. The method of claim 4, further comprising:
receiving, by the network device, a first request message transmitted by the UE; and updating, by the network device, a policy corresponding to a target policy type based on second information included in the first request message;

wherein the target policy type comprises the at least one of the PC5 interface-based V2X policy or the Uu interface-based V2X policy.

7. A device for policy determination, for use in User Equipment (UE), comprising:

a transceiver;

a processor; and a memory is configured to store computer program instructions that, when executed by the processor, cause the processor to perform a method for policy determination comprising:

receiving, through the transceiver, first information from a network device, the first information comprising a first policy, the first policy comprising a policy identifier (ID) and a policy content, and the policy content comprising at least one of a policy type field or a spare bit field for indicating a policy type corresponding to the first policy;

wherein the network device is a Policy Control Function (PCF), a content of the first information is divided into at least one section and is encapsulated into a container by the PCF for transmitting to a Core Access and Mobility Management Function (AMF), and the container is transparently transmitted to the UE by the AMF;

wherein the policy type corresponding to the first policy comprises at least one of a PC5 interface-based Vehicle to Everything (V2X) policy or a Uu interface-based V2X policy.

8. The device of claim 7, wherein the first information further comprises: a trigger condition for the UE to request the first policy.

9. The device of claim 7, wherein the processor is further configured to transmit, through the transceiver, a first request message to the network device, the first request message comprising second information and the second information being configured to instruct the network device to update a policy corresponding to a target policy type;

wherein the target policy type comprises the at least one of the PC5 interface-based V2X policy or the Uu interface-based V2X policy.

10. A non-transitory computer readable storage medium, having stored thereon computer program instructions that, when executed by a processor of User Equipment (UE), cause the processor to perform a method for policy determination comprising:

receiving first information transmitted by a network device, the first information comprising a first policy, the first policy comprising a policy identifier (ID) and a policy content, and the policy content comprising at least one of a policy type field or a spare bit field for indicating a policy type corresponding to the first policy;

wherein the network device is a Policy Control Function (PCF), a content of the first information is divided into at least one section and is encapsulated into a container by the PCF for transmitting to a Core Access and Mobility Management Function (AMF), and the container is transparently transmitted to the UE by the AMF;

wherein the policy type corresponding to the first policy comprises at least one of a PC5 interface-based Vehicle to Everything (V2X) policy or a Uu interface-based V2X policy.

* * * * *